(No Model.)
W. E. MASON.
CAR WHEEL.
No. 305,616. Patented Sept. 23, 1884.
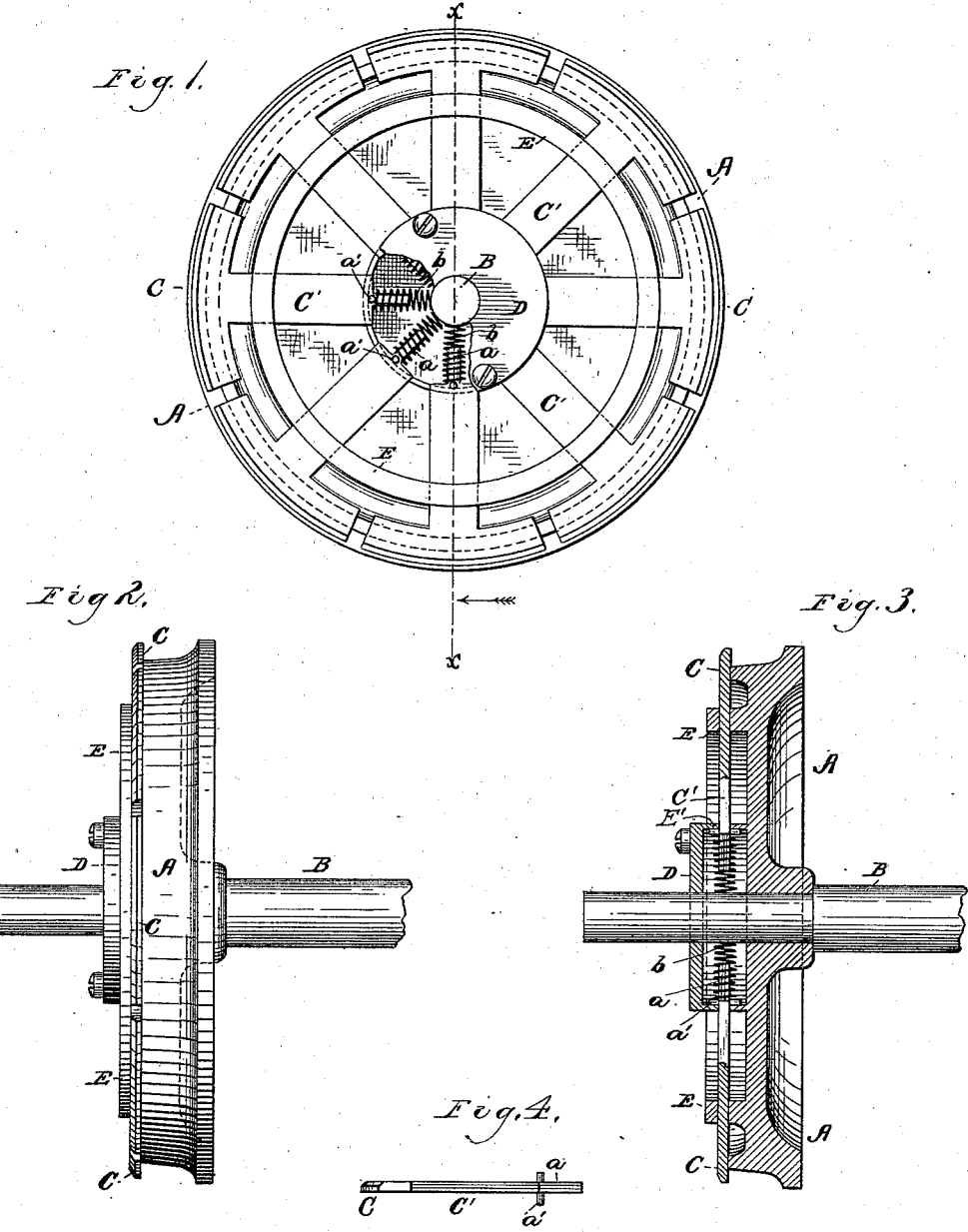
Witnesses
Henry Frankfurter
W. L. Baker
Inventor
William E. Mason
per. Merriam & Whipple
Attorneys.

UNITED STATES PATENT OFFICE.

WILLIAM E. MASON, OF CHICAGO, ILLINOIS.

CAR-WHEEL.

SPECIFICATION forming part of Letters Patent No. 305,616, dated September 23, 1884.

Application filed November 30, 1883. (No model.)

*To all whom it may concern:*

Be it known that I, WILLIAM E. MASON, of Chicago, State of Illinois, have invented certain new and useful Improvements in Car-Wheels for Railroad-Cars, of which the following is a specification.

The invention consists in providing the car-wheel with an outside flange to prevent derailing the cars, the flange being made flexible or yielding toward the center of the wheel to enable it to pass over crossings and switches.

The accompanying drawings illustrate the invention.

Figure 1 is a side elevation of a car-wheel, showing the outside of the wheel. Fig. 2 is an edge view. Fig. 3 is a section taken on line $x\ x$ of Fig. 1. Fig. 4 is an edge view of a detached part.

The car-wheel A is provided with the ordinary tread and inside flange. The axle B is also of the ordinary construction.

C is the outside flexible flange, which has the capacity of yielding toward the center of the wheel to an extent sufficient to allow the outer edge of the flange to come flush or even with the tread, in order that the flange may pass over crossings and switches; but it is wholly unyielding to lateral strain, so that it will cause the wheel to follow the rail upon one side of the track when the rail upon the opposite side is broken, loose, or removed, and so keep the opposite wheel in proper line and position to take the track or rail again after it has passed the defective place. The flange C is made in sections, each of which is maintained in outward or extended position by a spring, $b$, which should be of sufficient strength to keep the flange in this position and prevent any jarring or looseness, but which will yield in the event of the flanges coming in contact with the cross-rails at crossings or switches, so as not to throw the weight of the car upon the flange and cause it to raise the tread of the wheel from the track. This flange may be secured to the outside of the wheel in various ways. The drawings show the best way in which I have contemplated applying the same. The outside of the wheel is provided with concentric projections or flanges E E', made integral with the wheel or separately, and fastened thereto by bolts, or otherwise. These flanges are provided with openings, through which the radial arms C' of the flange C pass and fit closely, so as to allow no lateral play to the flange. The flanges are made of plate-steel, and the space between the sections and between the flange and concentric projection E is just sufficient to allow enough inward movement of the flange to bring its outer edge even with the tread of the wheel. The inner ends, $a$, of arms C' are extended inside of the springs $b$, to hold them in position, and a pin or bolt, $a'$, passing through the arms and secured therein inside of the concentric projection E', prevents the extension of the flange beyond its proper position. A cap or covering, D, covers the springs. The arms C' may be made wider, if more strength is required in the flange. The sections of the flange C are separately movable inwardly even with the tread and back again to the outward normal position, thus enabling the flange to be pressed in even with the tread upon one side of the wheel or circle while in its normal position on the opposite side.

Car-wheels have heretofore been shown having an outer adjustable flange not made in sections, but as an entire thing, which, when it moves inwardly on the lower side, as in passing a crossing, must be correspondingly moved outwardly at the same time on the upper or opposite side. My invention does not include the adjustable flange so constructed and operating.

What I claim is—

A railroad-car wheel having an outer adjustable or compressible flange, C, composed of independent inwardly-yielding sections, substantially as and for the purpose specified.

WILLIAM E. MASON.

Witnesses:
C. K. LOWE,
JNO. H. WHIPPLE.